United States Patent
Bell et al.

(10) Patent No.: US 10,257,367 B2
(45) Date of Patent: Apr. 9, 2019

(54) MANAGEMENT OF TELEPHONE CALLS WITH EXPENSES OPTIMIZATION

(71) Applicant: INTERNATIONAL BUSINESS MACHINES CORPORATION, Armonk, NY (US)

(72) Inventors: Denise A. Bell, Austin, TX (US); Cristina Bonanni, Rome (IT); Patrizia Manganelli, Rome (IT); Randa Salem, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 15/271,322

(22) Filed: Sep. 21, 2016

(65) Prior Publication Data
US 2018/0084112 A1 Mar. 22, 2018

(51) Int. Cl.
*H04M 15/00* (2006.01)
*H04M 15/16* (2006.01)
*H04M 3/38* (2006.01)
*H04M 3/436* (2006.01)
*H04M 3/42* (2006.01)

(52) U.S. Cl.
CPC .......... *H04M 15/745* (2013.01); *H04M 3/38* (2013.01); *H04M 3/436* (2013.01); *H04M 15/16* (2013.01); *H04M 3/42263* (2013.01)

(58) Field of Classification Search
CPC ...... H04W 8/20; H04W 92/18; H04L 63/104; H04L 67/22; H04L 67/24; H04M 15/765; H04N 21/4751
See application file for complete search history.

(56) References Cited

U.S. PATENT DOCUMENTS

| | | |
|---|---|---|
| 5,027,387 A | 6/1991 | Moll |
| 6,810,260 B1 | 10/2004 | Morales |
| 7,200,381 B2 | 4/2007 | Halkosaari et al. |
| 7,613,154 B2 | 11/2009 | Caspi et al. |
| 7,885,394 B2 | 2/2011 | Baudino et al. |

(Continued)

OTHER PUBLICATIONS

Fitkov-Norris "Dynamic pricing in mobile communication systems", Abstract only, IEEE.org; IEEE Xplore Digital Library; URL:http://ieeexplore.ieee.org/xpl/login.jsp?tp=&arnumber=858321&url=http%3A%2Fieeexplore.ieee.org%2Fiel5%2F6929%2F18626%2F00858321.pdf%3Farnumber%3D858321; downloaded Mar. 30, 2016; 2 pgs.

*Primary Examiner* — Nizar N Sivji
(74) *Attorney, Agent, or Firm* — Cantor Colburn LLP; Jeffrey S. LaBaw

(57) ABSTRACT

Methods and systems for managing telephone calls are provides. Aspects include setting one or more telephone numbers of one or more contacts of an owner of a telephone as child telephone numbers of a master telephone number of the telephone according to a correlation of the contacts to the owner based on user information thereof. Aspects also include assigning one of a plurality of call preferences to each child telephone number according to expenses information of telephone calls from the child telephone number to the master telephone number and from the master telephone number to the child telephone number and managing each telephone call received by the master telephone number from each child telephone number according to the corresponding call preference.

13 Claims, 7 Drawing Sheets

(56) References Cited

U.S. PATENT DOCUMENTS

| | | | |
|---|---|---|---|
| 8,116,726 B2* | 2/2012 | Richardson | H04M 1/66 |
| | | | 455/404.1 |
| 8,275,348 B2 | 9/2012 | Yen et al. | |
| 8,494,499 B2 | 7/2013 | Wei et al. | |
| 8,615,220 B2 | 12/2013 | Gaikwad et al. | |
| 9,124,725 B2 | 9/2015 | Bhogal et al. | |
| 2002/0147710 A1 | 10/2002 | Hu | |
| 2008/0037554 A1* | 2/2008 | Vincent | H04L 51/14 |
| | | | 370/395.42 |
| 2008/0123629 A1 | 5/2008 | Ou Yang et al. | |
| 2008/0261603 A1 | 10/2008 | Sever et al. | |
| 2008/0319879 A1 | 12/2008 | Carroll et al. | |
| 2010/0105354 A1 | 4/2010 | Huang | |
| 2012/0158935 A1* | 6/2012 | Kishimoto | G06Q 10/10 |
| | | | 709/223 |
| 2017/0251093 A1* | 8/2017 | Park | H04M 1/7253 |

\* cited by examiner

MANAGEMENT OF TELEPHONE CALLS WITH EXPENSES OPTIMIZATION

BACKGROUND

The present disclosure relates to the information technology field. More specifically, this disclosure relates to the management of telephone calls.

Telephone calls are commonplace for conducting (remote) conversations between users of corresponding telephones. Several factors affect the costs of the telephone calls, especially in case one or more mobile telephones are involved. Particularly, the costs mainly depend on telephone plans of the users; for example, the telephone plans may have a pay-per-use rate (with possible fixed costs and costs per time unit) or a flat rate (with or without limits). Moreover, the costs may depend on current positions of the telephones (for example, because of roaming costs when abroad).

Different techniques have been proposed for reducing the costs of the telephone calls (either statically or dynamically). For example, same web sites collect information about the telephone plans of different telephone operators; moreover, these web sites may also allow comparing the telephone plans (for example, according to an estimated average usage of the telephones).

However, the above-mentioned techniques may cause undesired results. Particularly, the way of conducting the telephone calls may be changed even when it is not desired; for example, the reversal of the calls may occur in situations wherein this is not desired by the user incurring the corresponding costs.

SUMMARY

Embodiments include a methods, systems and computer program products for managing telephone calls, wherein each telephone call received by a master telephone number of a telephone terminal from a child telephone number (set according to a correlation of a corresponding contact to the owner of the telephone terminal) is managed according to at least one call preference of the child telephone number (determining according to expenses information of telephone calls from the child telephone number to the master telephone number and vice-versa).

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

With reference, in particular, to FIG. 1A-FIG. 1D, the general principles are shown of the solution according to an embodiment of the present disclosure.

Figure 1A:
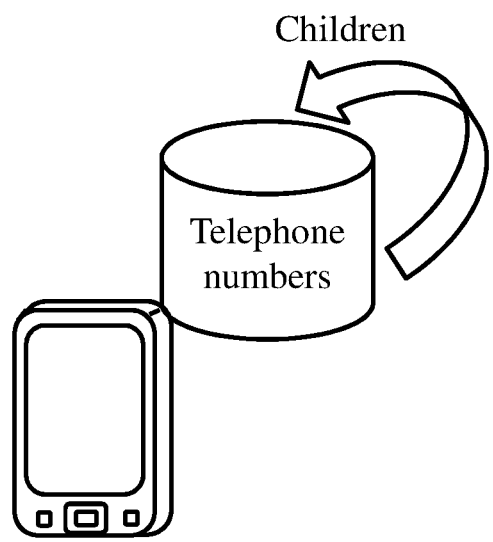
FIG. 1A, FIG. 1B, FIG. 1C and FIG. 1D show the general principles of the solution according to an embodiment of the present disclosure.

Starting from FIG. 1A, as usual, a telephone has a corresponding telephone number (or more) of an owner thereof. The owner has one or more contacts, each one having one or more corresponding telephone numbers (for example, stored in a telephone book of the telephone).

In the solution according to an embodiment of the present disclosure, some of the telephone numbers of the contacts are set as child telephone numbers of the telephone number of the owner (referred to as master telephone number); this operation is performed according to a correlation of the contacts to the owner that is based on user information thereof (for example, family, colleagues, friends based on other telephone numbers, e-mail addresses, groups of chat services, telephone call frequencies).

Figure 1B:
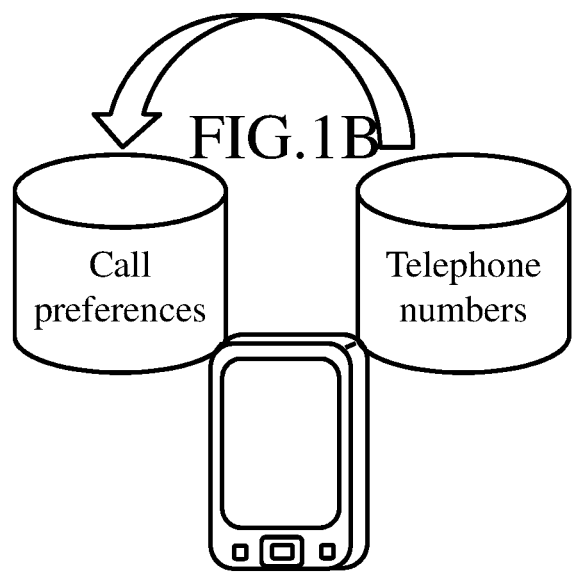

Moving to FIG. 1B, each child telephone number is then assigned a call preference, or more (among a plurality of predefined call preferences); the call preference is determined according to expenses information of telephone calls from the master telephone number to the child telephone number and, vice-versa, from the child telephone number to the master telephone number (for example, based on their telephone plans). Particularly, the call preferences comprise a preferred direction of the telephone calls between the master telephone number and the child telephone number, i.e., an incoming direction from the child telephone number to the master telephone number and an outcoming direction from the master telephone number to the child telephone number (for example, the lesser expensive one).

Figure 1C:
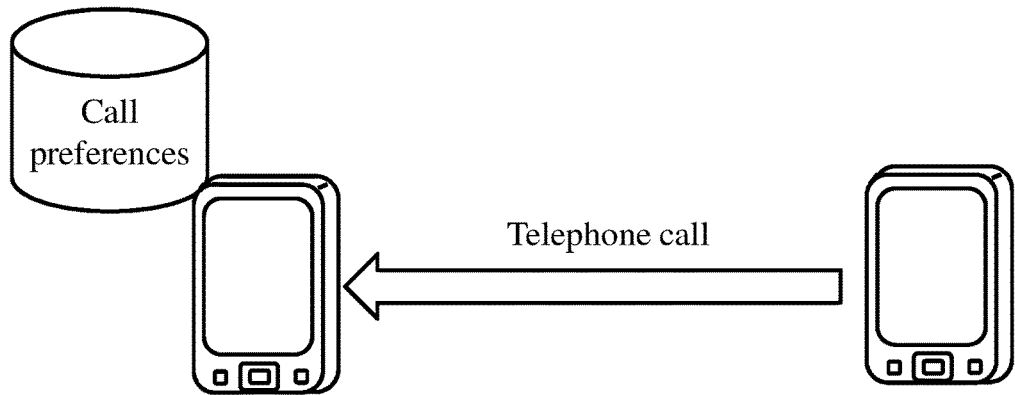

Moving to FIG. 1C, a telephone call is received (in the telephone) by the master telephone number from any child telephone number thereof.

Figure 1D:
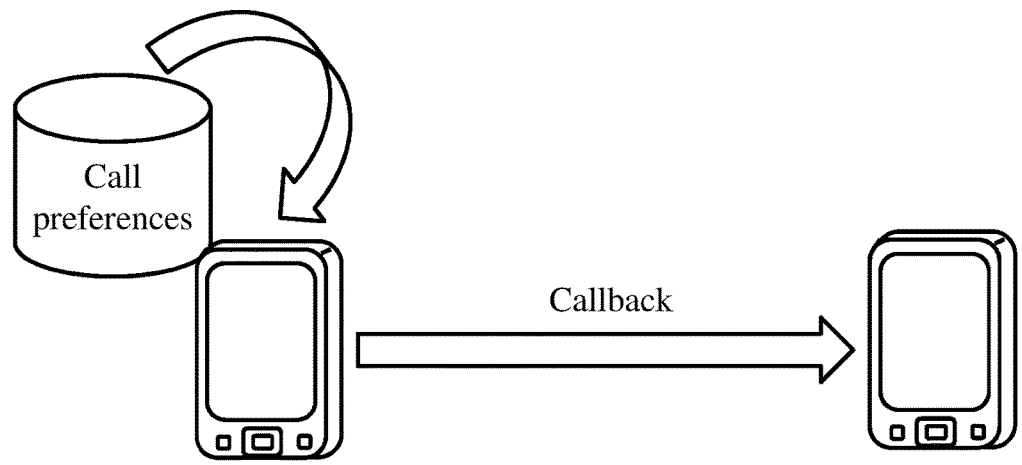

Moving to FIG. 1D, the received telephone call is managed according to the corresponding call preference. For example, when the call preference indicates the outcoming direction, the received telephone call (more expensive) is closed and the child telephone number is called back by the master telephone number (in order to establish a less expensive telephone call between them in the opposite direction).

The above-described solution allows optimizing the expenses (in the broadest meaning of the term) of the telephone calls. However, this is not applied indiscriminately but it is limited to specific contacts that are correlated to the owner. This allows avoiding wasting resources of the owner (for example, money of a pay-per-use rate or a remaining allowance of a flat rate) when it is not desired; for example, the costs of the telephone calls may be incurred by parents instead of their children, by managers instead of other employees of the same company, by strict friends with the most convenient telephone planes.

Figure 2:
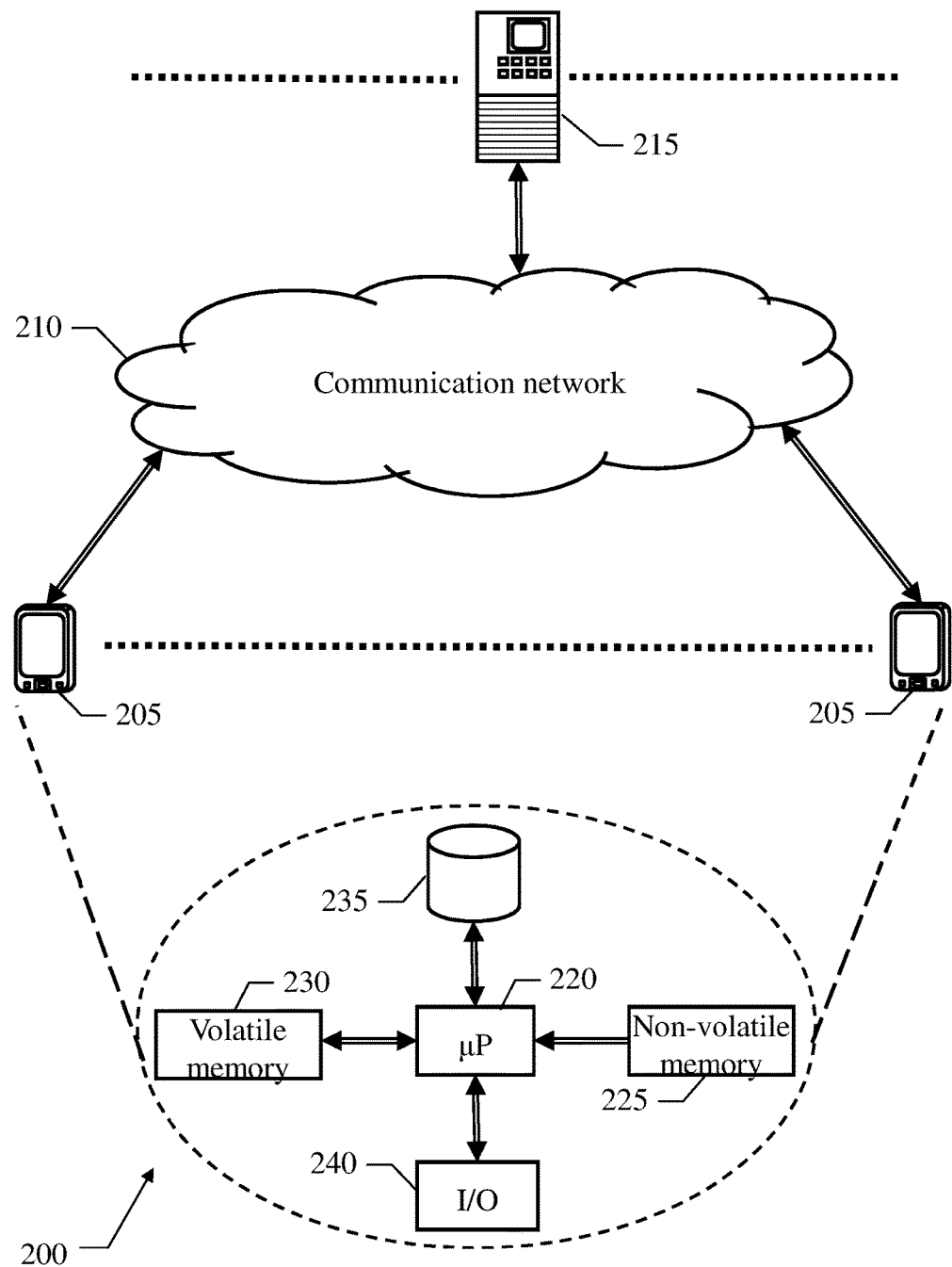
FIG. 2 shows a schematic block diagram of an infrastructure wherein the solution according to an embodiment of the present disclosure may be practiced.

With reference now to FIG. 2, a schematic block diagram is shown of an infrastructure 200 wherein the solution according to an embodiment of the present disclosure may be practiced.

The infrastructure 200 comprises a number of mobile telephone terminals, or simply telephones, 205 (for example, smartphones); each telephone 205 has a corresponding telephone number (or more), stored in a SIM card that is plugged in the telephone 205. As usual, the telephones 205 allow their users to exploit services offered by mobile telephone operators of their telephone numbers (subscribed thereto) through corresponding mobile telephone networks (not shown in the figure). Particularly, for telephones 205 may perform telephone calls and exchange SMSs among them; moreover, the telephones 205 may access a communication network 210 (for example, based on the Internet), through either the mobile telephone network or wireless network access points, for example, of the Wi-Fi type (not shown in the figure). A number of server computing systems, or simply servers, are connected to the communication network 210 for providing corresponding services; in the solution according to an embodiment of the present disclosure, an optimization server (or more) 215 provides services that are exploited by the telephones 205 for optimizing their telephone calls (as described in detail in the following).

Each one of the above-described computing devices of the infrastructure 200 (i.e., the telephones 205 and the optimization server 215) comprises several units that are connected among them (for example, through a communication bus and a cabling sub-system of a data center for the optimization server 215 or through a communication bus for the telephones 205). Particularly, one or more microprocessors (μP) 220 control operation of the computing device; a non-volatile memory 225 (for example, an EPROM) stores basic code for a bootstrap of the computing device and a volatile memory 230 (for example, a DRAM) is used as a working memory by the microprocessors 220. The computing device is provided with a mass memory 235 for storing programs and data (for example, storage devices of the data center for the optimization server 215 and flash memories for the telephones 205). Moreover, the computing device comprises a number of peripheral (or Input/Output, I/O) units 240; for example, the peripheral units 240 of the optimization server 215 comprise a network interface card (NIC) for connecting to the communication network 210 (through a router sub-system of the data center) and a drive for reading/writing removable storage units (like DVDs) implemented by a console of the data center, whereas the peripheral units 240 of the telephones 205 comprise a mobile telephone transceiver (TX/RX) for communicating with the mobile telephone network, a Wireless NIC (WNIC) of the Wi-Fi type for communicating with the access points, a GPS receiver for detecting a (current) position of the telephones 205, a proximity sensor arranged close to a loudspeaker of the telephones 205 for detecting the presence of any objects in proximity thereto (for example, within an operative range thereof of 2-5 cm), an accelerometer for measuring a (proper) acceleration of the telephones 205 and a touch-screen for displaying information and entering commands.

Figure 3:
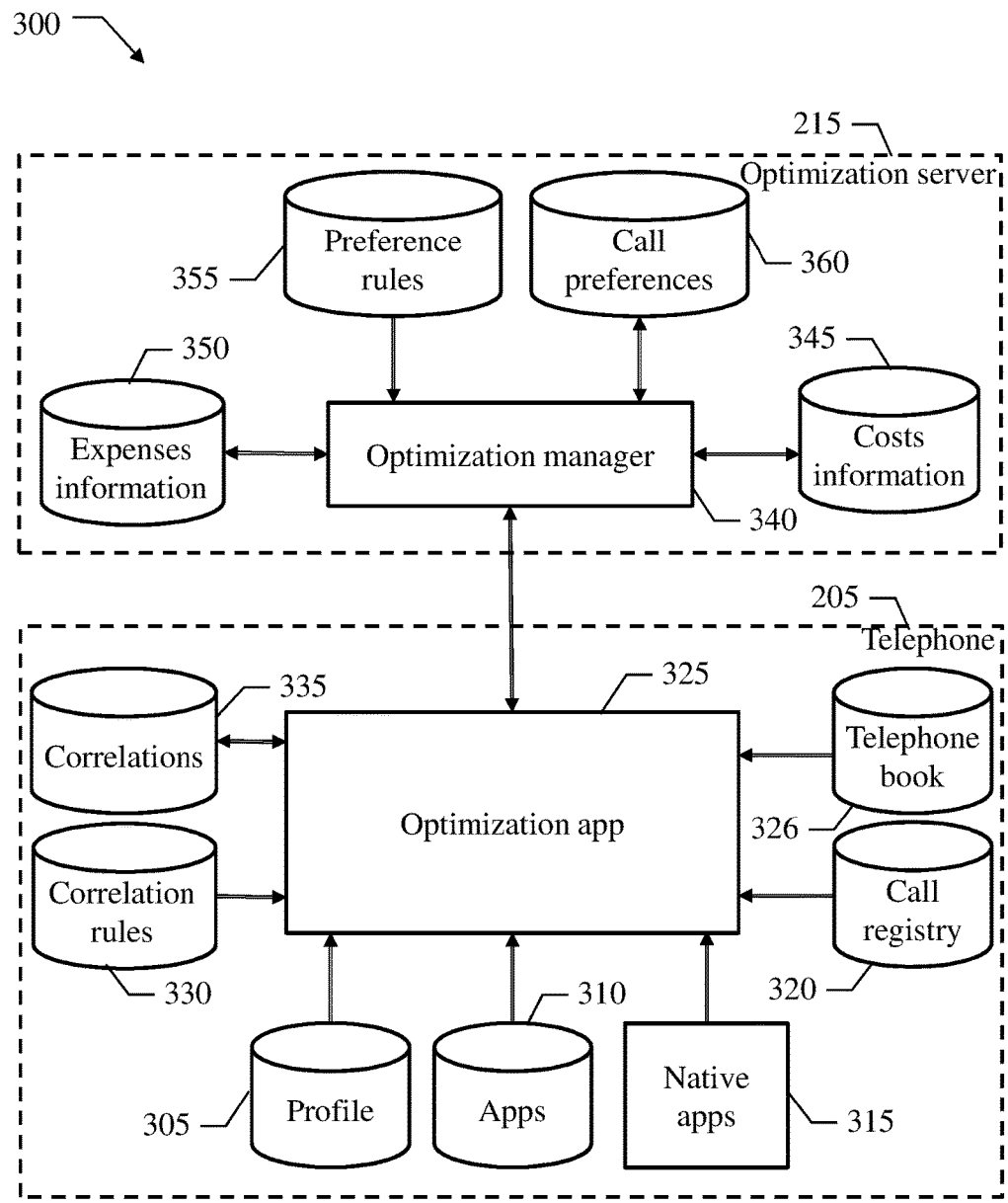
FIG. 3 shows the main software components that may be used to implement the solution according to an embodiment of the present disclosure.

Moving to FIG. 3, the main software components are shown that may be used to implement the solution according to an embodiment of the present disclosure.

Particularly, all the software components (programs and data) are denoted as a whole with the reference 300. The software components are typically stored in the mass memory and loaded (at least partially) into the working memory of each computing device when the programs are running, together with an operating system and other application programs (not shown in the figure). The programs are initially installed into the mass memory, for example, from removable storage units or from the communication network. In this respect, each program may be a module, segment or portion of code, which comprises one or more executable instructions for implementing the specified logical function.

Starting from each telephone 205 (only one shown in the figure), as usual a profile repository 305 stores a profile of its telephone number (downloaded from a server of the mobile telephone operator, not shown in the figure); for example, the profile comprises an indication of a telephone plan (such as with a pay-per-use or flat rate, either with no limits or with limits for telephone calls, SMSs and data traffic, costs for telephone calls, SMSs and data traffic always in case of pay-per-use rate or only after exceeding the corresponding limits in case of flat rate), a remaining allowance (for telephone calls, SMSs and data traffic in case of flat rate with corresponding limits) and a prepaid credit (for rechargeable contracts). Moreover, an app registry 310 stores an indication of all the mobile applications (apps) that are installed on the telephone 205. Particularly, one or more native apps 315 are installed on the telephone; as far as relevant to the present disclosure, the native apps 315 comprise a location app controlling the GPS receiver, a proximity app controlling the proximity sensor and an acceleration app controlling the accelerometer. A call registry 320 stores historical information of the telephone calls that have been performed with the telephone 205 (for example, the other telephone numbers being involved, their direction, time and duration). A telephone book 326 stores information of the user of the telephone 205 (owner) and of the users of other telephones known thereto (contacts); for example, for each user the telephone book comprises name, surname, nickname, mobile and fixed telephone numbers, personal and business mail addresses, and a favorite flag.

In the solution according to an embodiment of the present disclosure, an optimization app 325 controls the optimization of the telephone calls with the telephone number of the telephone 205. The optimization app 325 accesses (in read mode only) the profile repository 305, the app registry 310, the call registry 320 and the telephone book 326, and it exploits the location app, the proximity app and the acceleration app of the native apps 315.

Moreover, the optimization app 325 accesses (in read mode only) a correlation rule repository 330, which stores an indication of one or more correlation rules for classifying the contacts into one or more correlation groups (together with the owner); for example, each correlation (defined by one or more correlation conditions combined with logical operators) assigns each contact to a corresponding correlation group when it is satisfied. A possible correlation rule assigns a contact to a correlation group "family" when the owner and the contact have the same home's fixed telephone number or the same home's address. Another possible correlation rule assigns a contact to a correlation group "colleagues" when the owner and the contact have their business's e-mail addresses with the same domain. Another possible correlation rule assigns a contact to a correlation group "friends" when the favorite flag of the contact is asserted and a frequency of their telephone calls reaches a threshold (for example, 5-10 per week in the last month). The correlation rules are ordered according to a confidence thereof, based on how much they are deemed reliable to classify the contacts correctly (for example, the correlation rules of the correlation groups "family", "colleagues" and "friends" in decreasing order of confidence).

The optimization app 325 controls (in read/write mode only) a (local) correlation repository 335, which stores information relating to the contacts that have been classified (in the same correlation groups of the owner), i.e., they are correlated to the owner and then their telephone numbers are child telephone numbers of the (master) telephone number of the owner. For example, for each contact the correlation repository 335 comprises its correlation group; for each child telephone number of the contact, the correlation repository 335 then comprises its call preference. The call preference indicates a preferred way of managing the telephone calls between the master telephone number and the child telephone number. Particularly, the call preference may be "incoming direction" to indicate that the telephone calls are preferable from the child telephone number to the master telephone number or "outcoming direction" to indicate that the telephone calls are preferable from the master telephone number to the child telephone number. Moreover, the call preference may be "alternative channel" to indicate that one or more alternative conversation channels are preferable to the telephone calls (for example, VOIP telephone call services, instant messaging services); in this case, the call preference also list these alternative conversation channels, in decreasing order of preference. Moreover, the call preference may be "call rejection" to indicate that the telephone calls between the master telephone number and the child telephone number are preferably to be avoided.

Moving to the optimization server 215, an optimization manager 340 manages the optimization of the telephone calls between the pairs of master and child telephone numbers of the telephones 205. For this purpose, the optimization manager 340 communicates with the optimization app 325 of the telephones 205.

Moreover, the optimization manager 340 controls (in read/write mode) a costs repository 345, which stores costs information of telephone calls with the telephone numbers of the telephones 205; for example, for each telephone number the costs repository 345 comprises the corresponding profile (i.e., telephone plan, remaining allowance and prepaid credit), any alternative conversation channels that are available on the corresponding telephone 205 and information relating thereto (for example, established Wi-fi connection), and the position of the telephone 205.

The optimization manager 340 controls (in read/write mode) an expenses repository 350, which stores expenses information of telephone calls between the child telephone numbers and the corresponding master telephone numbers (in both directions); for example, for each child telephone number the expenses information indicates expected costs (such as per time unit, like minute) of telephone calls from the child telephone number to the master telephone number and from the master telephone number to the child telephone number (together with pointers to the remaining allowance, the prepaid credit and the alternative conversation channels of the child telephone number and of the master telephone number in the costs repository 345).

The optimization manager 340 accesses (in read mode only) a preference rule repository 355, which stores preference rules for determining the call preferences of the child telephone numbers. For example, the preference rules indicate that when the expenses for the telephone calls between the child telephone number and the corresponding master telephone number (in both directions) are higher than a threshold the call preference is set to "call reject" if no alternative conversation channels are available (with costs lower than the same threshold) or to "alternative channel" otherwise (with the addition of each alternative conversation channel). If the above-mentioned conditions are not satisfied, the call preference is instead set to "outcoming direction" when the expenses of the telephone calls from the master telephone number to the child telephone number are lower than the costs of the telephone calls in the opposite direction by a threshold (down to zero), and at the same time the remaining allowance of the master telephone number is higher than a threshold (for example, 5-10 minutes) in case of flat rate with the corresponding limit that has not been exceeded yet or the prepaid credit of the master telephone number is higher that a threshold otherwise. If the above-mentioned conditions are not satisfied as well, the call preference is set to "incoming direction". The optimization manager 340 controls (in read/write mode) a (global) call preference repository 360, which stores an indication of the call preferences of the child telephone numbers of the telephones 205; for example, for each master telephone number the call preference repository 360 comprises an indication of the call preference of each child telephone number thereof.

Figure 4A:
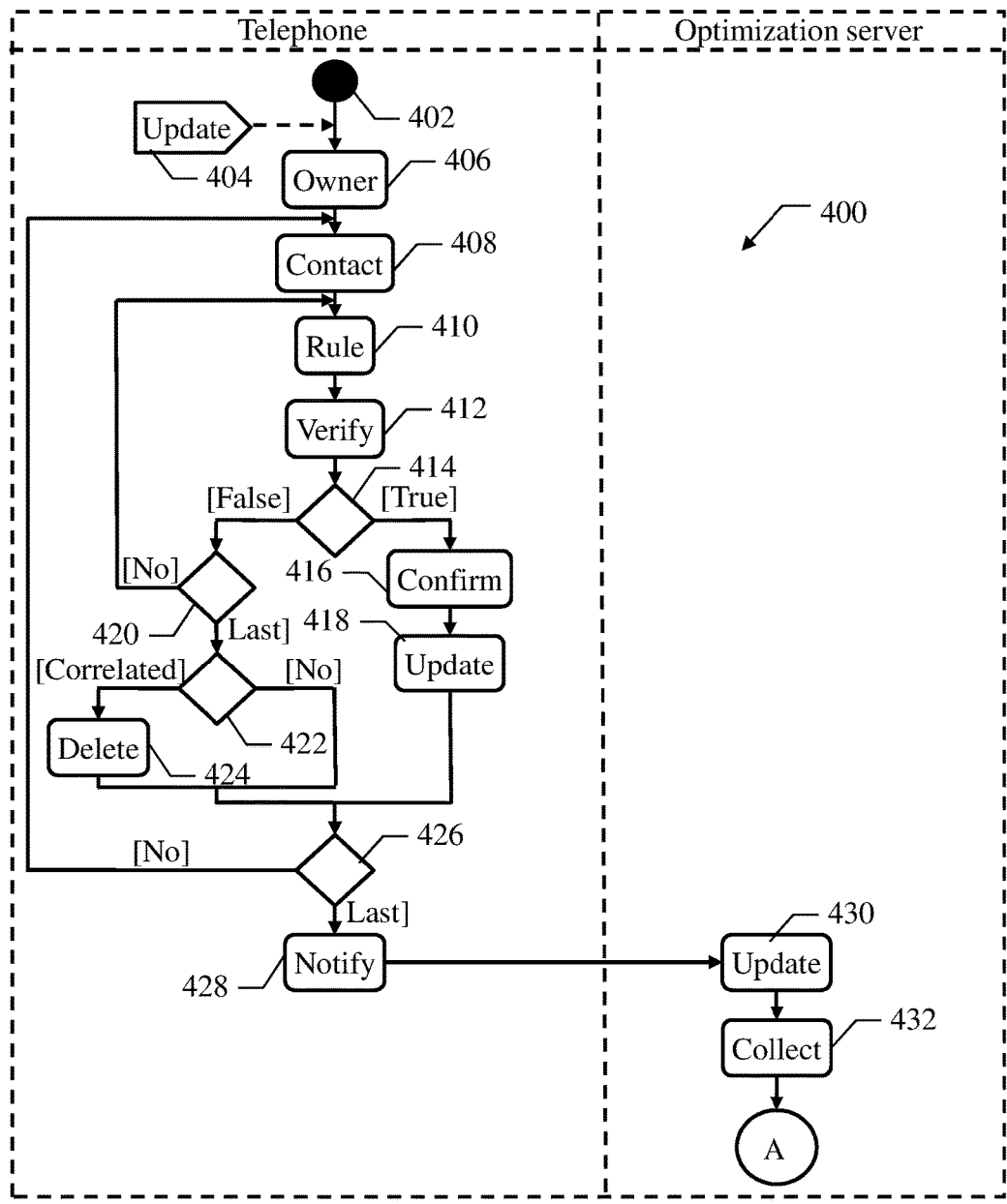
FIG. 4A, FIG. 4B and FIG. 4C show an activity diagram describing the flow of activities relating to an implementation of the solution according to an embodiment of the present disclosure.
Figure 4B:
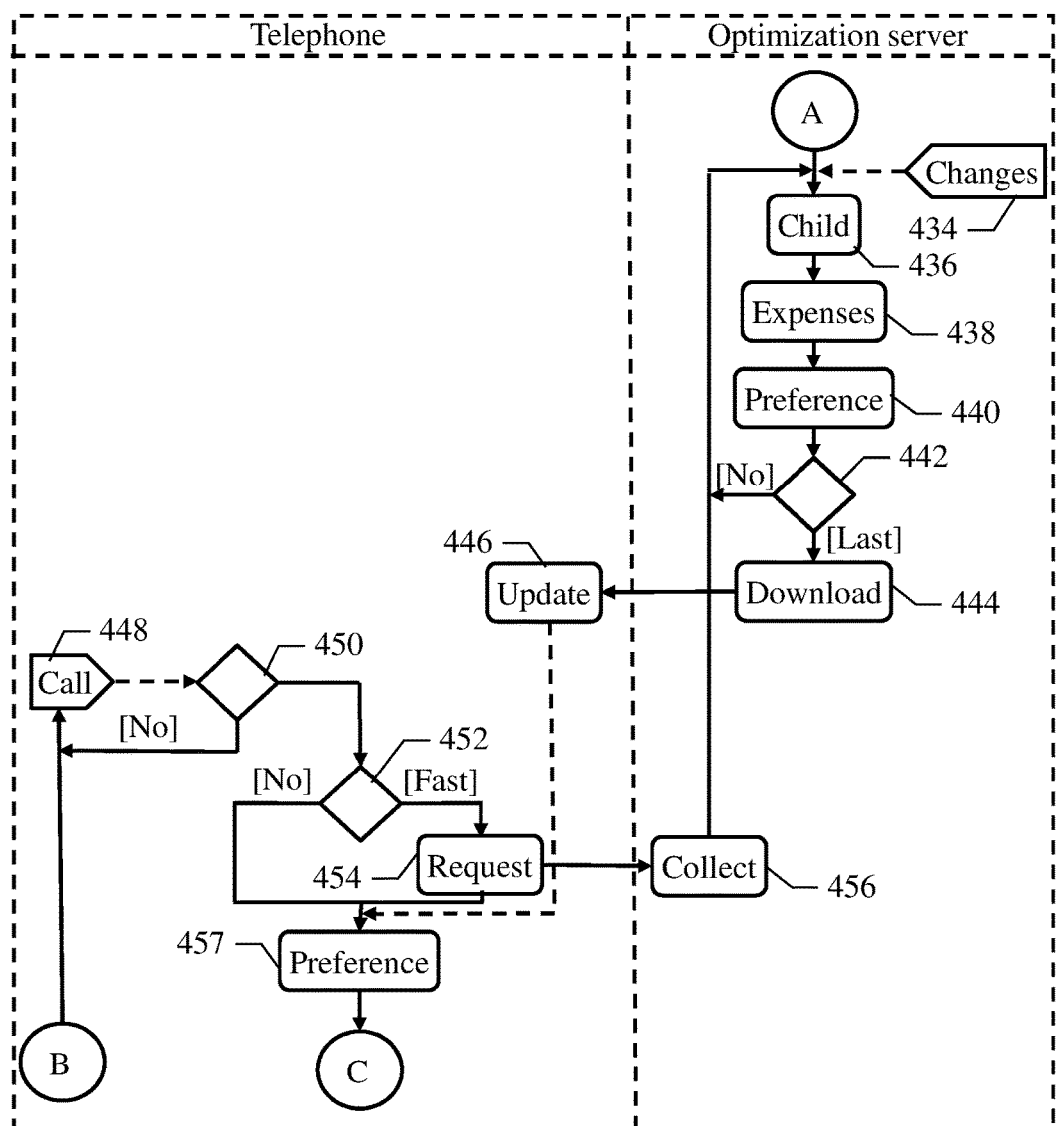
Figure 4C:
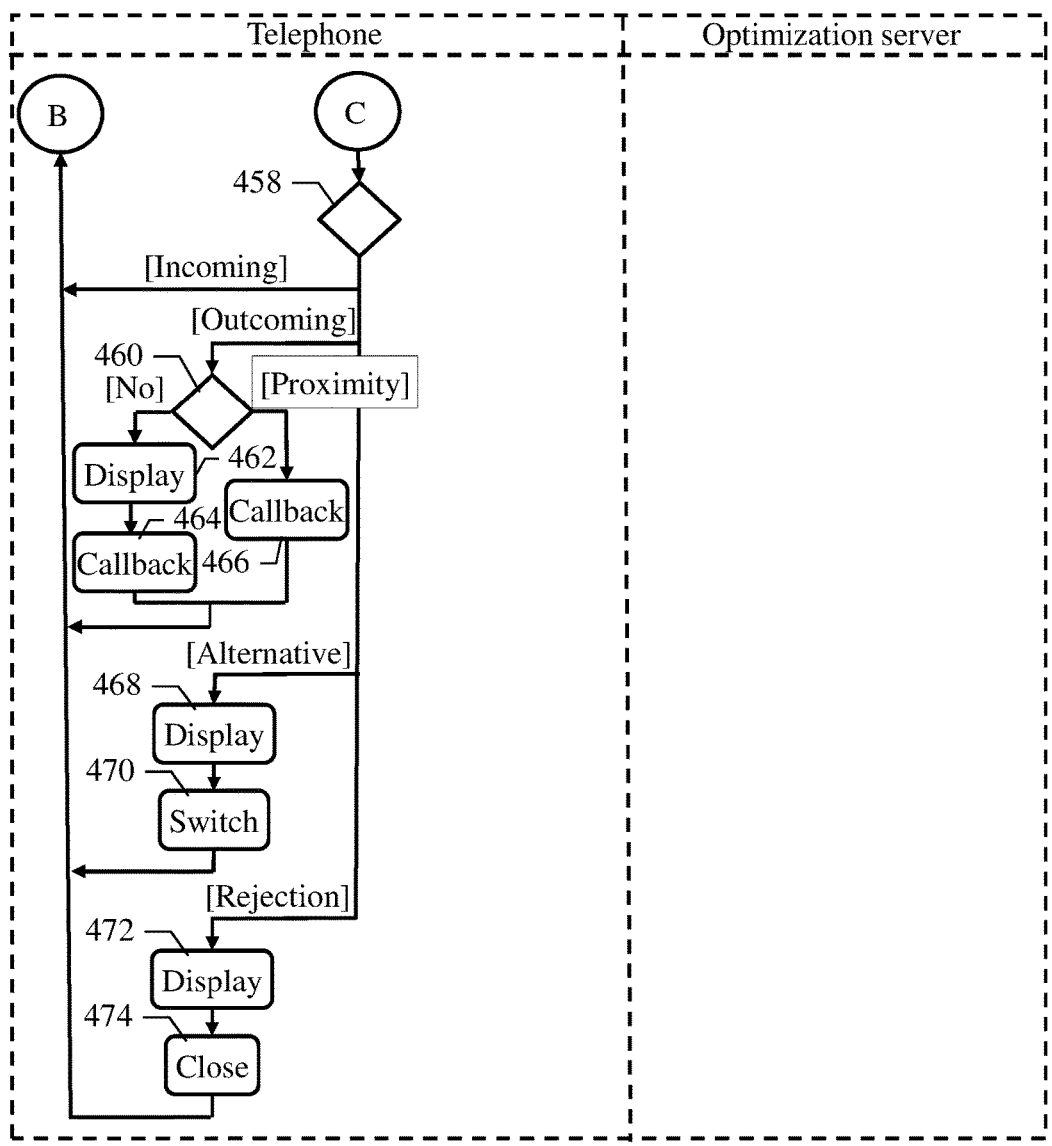

With reference now to FIG. 4A-FIG. 4C, an activity diagram is shown describing the flow of activities relating to an implementation of the solution according to an embodiment of the present disclosure.

Particularly, the diagram represents an exemplary process that may be used to manage the telephone calls of a generic telephone with a method 400. In this respect, each block may correspond to one or more executable instructions for implementing the specified logical function on the relevant computing devices.

The process begins at the black start circle 402 in the swim-lane of the telephone and then passes to block 404 as soon as its owner has installed the optimization app thereon; the same point is also reached from block 406 when the optimization app detects any changes of the telephone book (for example, by verifying it periodically like every 1-6 h) or periodically (for example, every day). In this phase, the optimization app collects user information of the owner, defined by his/her information extracted from the telephone book. A loop is then performed for processing the contacts of the owner (as indicated in the telephone book). The loop begins at block 408, wherein the optimization app takes a (current) contact into account (starting from a first one in any arbitrary order). At this point, the optimization app collects user information of the contact; for example, this user information comprises the information of the contact extracted from the telephone book and a conversation frequency of the telephone calls between the master telephone number and each child telephone number of the contact (calculated according to the information extracted from the telephone call registry). Continuing to block 410, the optimization app takes a (current) correlation rule into account (starting from a first one in decreasing order of their confidence). The optimization app verifies the correlation rule at block 412; for this purpose, its correlation conditions are evaluated according to the user information of the owner and of the contact and their results are combined accordingly. The flow of activity branches at block 414 according to this verification. If the correlation rule evaluates to true (meaning that it is satisfied), the process descends into block 416; at this point, if no registration for the contact is present in the correlation repository (meaning that the corresponding correlation is new), the optimization app asks the owner to confirm the correlation and it sends a message to the child telephone number (or more) of the contact asking him/her to confirm the correlation as well. Continuing to block 418, the optimization app updates the correlation repository accordingly, if it is necessary; particularly, if the correlation is new and it has been confirmed by both the owner and the contact, a corresponding registration with the correlation group and each child telephone number of the contact is added, whereas any piece of information of the contact that has changed is replaced otherwise. In this way, the correlation between the owner and the contacts (and then the management of the telephone calls between them) is subject to their agreement (especially for sharing the corresponding costs information). Returning to the block 414, if the correlation rule evaluates to false the process instead descends into block 420, wherein the optimization app verifies whether a last correlation rule has been verified. If not, the flow of activity returns to the block 410 to repeat the same operations for a next correlation rule. Conversely (once all the correlation rules have been verified without none of them being satisfied), the optimization app at block 422 verifies whether a registration for the contact is present in the correlation repository. If so (meaning that the contact was correlated to the owner), the optimization app deletes the registration of the contact (being not correlated to the owner any longer) from the correlation repository at block 424 (with the same operation that may also be performed at any time in response to an explicit request of the owner, not shown in the figure). The flow of activity merges again at block 426 from the block 418, from the block 424 or directly from the block 422 when no registration for the contact is present in the correlation repository; in any case, the optimization app now verifies whether a last contact has been processed. If not, the flow of activity returns to the block 408 to repeat the same operations for a next contact. Conversely (once all the contacts have been processed), the above-described loop is exit by descending into block 428, wherein the optimization app notifies any updates of the correlation repository to the optimization manager, if it is necessary.

Moving to the swim-lane of the optimization server, in response thereto the optimization manager updates the call preference repository accordingly at block 430. Continuing to block 432, the optimization manager collects the costs information of each telephone number relating to the updates that have been applied to the call preference repository, if it is necessary. Particularly, for each telephone number the optimization manager requests the costs information to the optimization app of its telephone; in response thereto, the optimization app retrieves the profile of its telephone number (from the profile repository), the alternative conversation channels of the telephone (from the app registry) and the position of the telephone (from the location app), and it returns this information to the optimization manager, which updates the costs repository accordingly. In a completely independent way, the optimization manager enters block 434 whenever any changes occur to the costs information of the telephone numbers indicated in the costs repository (for example, in response to corresponding notifications sent by the optimization apps of their telephones or detected by polling these optimization apps periodically); in response thereto, the optimization manager updates the costs repository accordingly.

In any case, a loop is then performed for determining the expenses information (from either the block 432 or the block 434). The loop begins at block 436, wherein the optimization manager takes a (current) child telephone number into account, among the ones that have been added to the call preference repository or whose relevant costs information, i.e., the costs information of the child telephone number and/or of the corresponding master telephone number, have changed (starting from a first one in any arbitrary order). Continuing to block 438, the optimization manager extracts the costs information of the child telephone number and of its master telephone number (from the costs repository), determines the expenses information of the child telephone number and updates the expenses information repository accordingly. For example, the expected costs of the telephone calls from each (master or child) telephone number (caller) to the other (child or master) telephone number (receiver) is set to zero in case the telephone plan of the caller telephone number has a flat rate (and the corresponding limit has not been exceeded) and both the corresponding telephones are in their countries or they are set to the costs per time unit according to the telephone plans of the caller telephone number and to the position of its telephone otherwise; moreover, the expected costs further comprise the costs per time unit for the receiver telephone number according to its telephone plan when the corresponding telephone is abroad.

With reference now to block 440, the optimization manager determines the call preference of the child telephone number and it updates the call preference repository accordingly; for this purpose, the optimization manager evaluates the preference rules (extracted from the preference rule repository) according to the expenses information of the child telephone number (extracted from the expenses repository). A test is then made at block 442, wherein the optimization manager verifies whether a last one of the relevant child telephone number has been processed. If not, the flow of activity returns to the block 436 to repeat the same operations for a next one of these child telephone numbers. Conversely (once all the child telephone number have been processed), the above-described loop is exit by descending into block 444; at this point, the optimization manager downloads the call preferences that have been determined to the corresponding telephones. In response thereto, at block 446 in the swim-lane of each one of these telephones the optimization app thereof updates (i.e., synchronizes) the correlation repository accordingly. In this way, the above-described operations are concentrated in the optimization server (without the need of disseminating the costs information among the telephones).

In a completely independent way, the process passes from block 448 to block 450 in the swim-lane of the telephone when a telephone call is received from another (caller) telephone number; at this point, the optimization app verifies whether a registration for the caller telephone number is present in the correlation repository (meaning that it is a child telephone number). If not, the process directly returns to the block 448 (waiting for a next telephone call), without performing without performing any operation (so that the telephone call is managed as usual). Conversely, the process continues to block 452 wherein the optimization app verifies whether a fast data connection with the optimization server is available (for example, when the telephone is connected to the Internet via the mobile telephone network in 3G/4G technology or via an access point). If so, the optimization app requests an update to the optimization manager of the call preference for the child telephone number at block 454. Moving to block 456 in the swim-lane of the optimization server, in response thereto the optimization manager collects the corresponding costs information (i.e., the costs information of the child telephone number and of the master telephone number) and it updates the costs repository accordingly as above. The same operations are then performed at the blocks 436-446 to determine the expenses information and the call preference of the child telephone number, and to download the call preference to the telephone (thereby updating the correlation repository). Returning to the swim-lane of the telephone, the flow of activity descends from the block 454 to block 457 as soon as the call preference of the child telephone number has been received from the optimization server, or in any case after a pre-defined waiting time, for example, 2-5 s. This allows having the most up-to-date version of the call preference (when it is possible). The same point is also reached directly from the block 452 when no fast data connection with the optimization server is available. In any case, the optimization app now retrieves the call preference of the child telephone number (from the correlation repository). The flow of activity then branches at block 458 according to this call preference.

Particularly, when the call preference is "incoming direction", the process directly returns to the block 448 (waiting for a next telephone call), without performing any operation (so that the telephone call is managed as usual).

With reference again to the block 458, when the call preference is "outcoming direction", the process descends into block 460; at this point, the optimization app verifies as usual whether the loudspeaker of the telephone has been brought to the ear of the owner (for example, when the accelerometer app measures an acceleration exceeding a threshold and the proximity app detects an object within its operative range). If not, at block 462 the optimization app displays a callback command on the touch-screen of the telephone (for example, a callback button in addition to the standard accept button and refuse button for accepting and refusing, respectively, the telephone call). Assuming that the owner selects the callback button, the process continues to block 464 (otherwise, as usual the telephone call is started if the user selects the accept button or it is closed if the owner selects the refuse button or after a predefined waiting time); at this point, the optimization app closes the telephone call and it calls back the child telephone number (so as to perform the telephone call in the preferred direction). As a result, the choice of the direction of the telephone call is always left to the owner. Referring back to the block 460, if the loudspeaker of the telephone has been brought to the ear of the owner, this may mean that the owner has decided to respond to the telephone call automatically (assuming that the telephone supports this functionality); in this case, the process continues to block 466 wherein the telephone call is closed and the child telephone number is called back automatically. In this case, the callback is completely opaque to the owner. The process then returns from the block 464 or from the block 466 to the block 448 waiting for a next telephone call.

With reference again to the block 458, when the call preference is "alternative channel" (with one or more alternative conversation channels), the process descends into block 468; at this point, the optimization app displays a switch command on the touch-screen of the telephone for each alternative conversation channel (for example, a switch button indicating the alternative conversation channel in addition to the accept button and the refuse button). Assuming that the owner selects one of the switch buttons, the process continues to block 470 (otherwise, the telephone call is started or closed as above); at this point, the optimization app closes the telephone call and it starts a conversation session between the master telephone number and the child telephone number via the alternative conversation channel of the selected switch button (so as to switch to this preferred conversation channel). In this way, the owner is informed that alternative conversation channels are preferable and s/he may decide to switch to one of them automatically. The process then returns to the block 448 waiting for a next telephone call.

With reference again to the block 458, when the call preference is "call rejection", the process descends into block 472; at this point, the optimization app displays a rejection command on the touch-screen of the telephone (for example, by highlighting the refuse button with respect to the accept button). Assuming that the owner selects the refuse button, the process continues to block 474 wherein the telephone call is closed as usual (otherwise, the telephone call is started or closed as above). In this way, the owner is informed that the telephone call is preferable to be avoided and s/he may decide to close it. The process then returns to the block 448 waiting for a next telephone call.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing telephone calls. However, the telephone calls may be of any type (for example, between mobile telephones, fixed telephones or any combination thereof).

In an embodiment, the method comprises setting at least part of one or more telephone numbers of one or more contacts of an owner of a telephone terminal as child telephone numbers of at least one master telephone number of the telephone terminal. However, any number of contacts, their telephone numbers and child telephone numbers is possible; moreover, the telephone terminal may be of any type (for example, a tablet, a cordless telephone) and it may have any number of master telephone numbers (for example, in a dual-SIM telephone).

In an embodiment, the above-mentioned setting is performed according to a correlation of the contacts to the owner based on user information thereof. However, the correlation may be of any type (for example, based on any number and type of correlation groups or simply of a single type) and it may be based on any user information (see below).

In an embodiment, the method comprises assigning at least one of a plurality of call preferences to each child telephone number. However, each child telephone number may be assigned any number of call preferences (among any number thereof that is available).

In an embodiment, this operation is performed according to expenses information of telephone calls from the child telephone number to the master telephone number and from the master telephone number to the child telephone number. However, the expenses information may be defined by any one of the above-mentioned pieces of information alone, any combination thereof or different, additional or alternative pieces of information (for example, expected costs of the telephone calls with average duration).

In an embodiment, the call preferences comprise an incoming direction of the telephone calls from the child telephone number to the master telephone number and an outcoming direction of the telephone calls from the master telephone number to the child telephone number. However, any number and type of additional call preferences may be available (down to none).

In an embodiment, the method comprises managing each telephone call received by the master telephone number from each child telephone number according to the corresponding call preference. However, the received telephone call may be managed in any way (for example, only supporting its callback or with any number and type of additional options, with the possibility of temporarily suspending it for specific child telephone numbers or for all of them).

In an embodiment, said step of setting at least part of one or more telephone numbers comprises evaluating one or more correlation rules defining corresponding correlation groups according to the user information of the owner and of each contact. However, the correlation rules may be in any number and of any type (for example, based on explicit and/or implicit social relations) and they may define any number and type of correlation groups (for example, customers).

In an embodiment, the user information comprises one or more fixed telephone numbers, one or more physical addresses and/or one or more e-mail addresses of the owner and of each contact and/or a favorite flag of each contact and/or a conversation frequency between the owner and each contact. However, the user information may be defined by any one of the above-mentioned pieces of information alone, any combination thereof or different, additional or alternative pieces of information (for example, company name, membership of contact groups and/or social groups).

In an embodiment, said step of managing each received telephone call comprises displaying a callback command on the telephone terminal in response to the received telephone call when the call preference is the outcoming direction. However, the callback command may be of any type (for example, a corresponding option after accepting the telephone call).

In an embodiment, said step of managing each received telephone call comprises closing the received telephone call and calling back the child telephone number from the master telephone number in response to a selection of the callback command. However, the possibility of performing theses operations automatically is not excluded (for example, always or only for specific child telephone numbers).

In an embodiment, said step of managing each received telephone call comprises verifying a proximity condition (indicative of a proximity of an ear of the owner to a loudspeaker of the telephone terminal) in response to the received telephone call when the call preference is the outcoming direction. However, the proximity condition may be verified in any way (for example, by applying more sophisticated algorithms).

In an embodiment, said step of managing each received telephone call comprises closing the received telephone call and calling back the child telephone number from the master telephone number in response to the proximity condition. However, these operations may be performed in different, additional or alternative conditions (for example, in response to a specific movement of the telephone) or never (for example, when the telephone does not support the automatic response functionality).

In an embodiment, the call preferences comprise one or more alternative conversation channels between the master telephone number and the child telephone number. However, the alternative conversation channels may be in any number and of any type, i.e., any one of the above-mentioned alternative conversation channels alone, any combination thereof or different, additional or substitute alternative conversation channels (for example, SMSs or calling cards).

In an embodiment, said step of managing each received telephone call comprises displaying one or more switch commands on the telephone terminal in response to the received telephone call when the call preference is one or more of the alternative conversation channels. However, the alternative conversation channels may be determined in any way (for example, conditioned on a Wi-fi connection); moreover, the switch commands may be in any number, for example, only for a preferred alternative conversation channel (such as selected according to its quality) or for all the alternative conversation channels. In this case as well, the switch commands may be of any type (for example, corresponding options after accepting the telephone call).

In an embodiment, said step of managing each received telephone call comprises closing the received telephone call and starting a conversation session between the master telephone number and the child telephone number via the corresponding alternative conversation channel in response to a selection of one of the switch commands. However, these operations may be performed in any way (for example, automatically for the preferred alternative conversation channel always or for specific contacts only); in any case, this possibility may be not available in a simplified implementation.

In an embodiment, the call preferences comprise a call rejection of the telephone calls from the child telephone number to the master telephone number. However, the call rejection may be of any type (for example, due to expenses higher than a threshold or prepaid credit lower than a threshold).

In an embodiment, said step of managing each received telephone call comprises displaying a rejection command on the telephone terminal in response to the received telephone call when the call preference is the call rejection. However, the rejection command may be of any type (for example, a dedicate button in addition to the standard one for refusing the telephone call).

In an embodiment, said step of managing each received telephone call comprises closing the received telephone call in response to a selection of the call rejection command. However, this operation may be performed in any way (for example, automatically always or for specific contacts only); in any case, this possibility may be not available in a simplified implementation.

In an embodiment, said step of assigning at least one of a plurality of call preferences comprises collecting costs information of telephone calls from the master telephone number and from each child telephone number. However, the costs information may be collected in any way (for example, directly from the telephones or from their telephone operators) and they may be of any type (see below).

In an embodiment, said step of assigning at least one of a plurality of call preferences comprises determining the expenses information of each child telephone number according to the costs information of the master telephone number and of the child telephone number. However, the expenses information may be determined in any way (for example, by weighting different expenses indexes based on corresponding pieces of cost information).

In an embodiment, the costs information comprises an indication of a telephone plan, a prepaid credit of a rechargeable contract and/or a remaining allowance of a flat rate of the telephone plane and/or a current position of the corresponding telephone terminal. However, the costs information may be defined by any one of the above-mentioned pieces of information alone, any combination thereof or different, additional or alternative pieces of information (for example, average durations and/or time of the telephone calls determined from historical information).

In an embodiment, the method further comprises triggering said assigning at least one of a plurality of call preferences in response to an update of the corresponding costs information. However, the update of the costs information may be detected in any way (for example, in push mode only, in pull mode only or in any combination thereof); in any case, this operation may be performed in any other way (for example, periodically).

In an embodiment, the method further comprises triggering said assigning at least one of a plurality of call preferences in response to the received telephone call. However, this operation may be performed always, only when specific conditions are satisfied (for example, according to costs and quality of the data traffic) or never.

In an embodiment, said step of assigning at least one of a plurality of call preferences comprises downloading the call preference of each child telephone number from a server computing system. However, the server computing system may be of any type (for example, one or more dedicated servers, servers of the telephone operators or backup servers of the telephone books); moreover, this operation may be performed in any way (for example, periodically) or never (i.e., when it is performed by the telephone that receives the costs information of the child telephone numbers from their telephones).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the software program may be implemented as a stand-alone module, as a plug-in for a pre-existing software program (for example, a management app of the telephone operator), or even directly in the latter; moreover, the software program may run on the telephone only or it may run in part on one or more servers (for example, implementing the setting of the child telephone number and/or the assignment of the call preferences as a service) and in part on the telephone (down to managing the telephone calls according to the call preferences only).

An embodiment provides a system comprising means configured for performing the each one of the steps of the above-mentioned method. An embodiment provides a system comprising a circuitry (i.e., any hardware suitably configured, for example, by software) configured for performing each one of the steps of the same method. However, the system may be of any type (for example, a telephone performing all the above-mentioned operations, one or more servers performing all the operations preceding the managing of the telephone calls for use by the telephone for this purpose or their combination).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing telephone calls, the method comprising:

setting at least part of one or more telephone numbers of one or more contacts of an owner of a telephone terminal as child telephone numbers of at least one master telephone number of the telephone terminal according to a correlation of the contacts to the owner based on user information thereof, assigning at least one of a plurality of call preferences to each child telephone number according to expenses information of telephone calls from the child telephone number to the master telephone number and from the master telephone number to the child telephone number, the call preferences comprising an incoming direction of the telephone calls from the child telephone number to the master telephone number; an outcoming direction of the telephone calls from the master telephone number to the child telephone number, and one or more alternative conversation channels between the master telephone number and the child telephone number, and managing each telephone call received by the master telephone number from each child telephone number according to the corresponding call preference by displaying one or more switch commands on the telephone terminal in response to the received telephone call when the call preference is one or more of the alternative conversation channels, and closing the received telephone call and starting a conversation session between the master telephone number and the child telephone number via the corresponding alternative conversation channel in response to a selection of one of the switch commands.

2. The method according to claim 1, wherein said setting at least part of one or more telephone numbers comprises:

evaluating one or more correlation rules defining corresponding correlation groups according to the user information of the owner and of each contact.

3. The method according to claim 1, wherein the user information comprises one or more fixed telephone numbers, one or more physical addresses and/or one or more e-mail addresses of the owner and of each contact and/or a favorite flag of each contact and/or a conversation frequency between the owner and each contact.

4. The method according to claim 1, wherein said managing each received telephone call comprises:
displaying a callback command on the telephone terminal in response to the received telephone call when the call preference is the outcoming direction, and
closing the received telephone call and calling back the child telephone number from the master telephone number in response to a selection of the callback command.

5. The method according to claim 1, wherein said managing each received telephone call comprises:
verifying a proximity condition, indicative of a proximity of an ear of the owner to a loudspeaker of the telephone terminal, in response to the received telephone call when the call preference is the outcoming direction, and
closing the received telephone call and calling back the child telephone number from the master telephone number in response to the proximity condition.

6. The method according to claim 1, wherein the call preferences comprise a call rejection of the telephone calls from the child telephone number to the master telephone number, said managing each received telephone call comprising:
displaying a rejection command on the telephone terminal in response to the received telephone call when the call preference is the call rejection, and
closing the received telephone call in response to a selection of the call rejection command.

7. The method according to claim 1, wherein said assigning at least one of a plurality of call preferences comprises:
collecting costs information of telephone calls from the master telephone number and from each child telephone number, and
determining the expenses information of each child telephone number according to the costs information of the master telephone number and of the child telephone number.

8. The method according to claim 7, wherein the costs information comprises an indication of a telephone plan, a prepaid credit of a rechargeable contract and/or a remaining allowance of a flat rate of the telephone plane and/or a current position of the corresponding telephone terminal.

9. The method according to claim 1, comprising:
triggering said assigning at least one of a plurality of call preferences in response to an update of the corresponding costs information.

10. The method according to claim 1, comprising:
triggering said assigning at least one of a plurality of call preferences in response to the received telephone call.

11. The method according to claim 1, wherein said assigning at least one of a plurality of call preferences comprises:
downloading the call preference of each child telephone number from a server computing system.

12. A computer program product, the computer program product comprising a computer readable storage medium having program instructions embodied therewith, the program instructions being executable by a computing system to cause the computing system to perform a method for managing telephone calls, the method comprising:
setting at least part of one or more telephone numbers of one or more contacts of an owner of a telephone terminal as child telephone numbers of at least one master telephone number of the telephone terminal according to a correlation of the contacts to the owner based on user information thereof,
assigning at least one of a plurality of call preferences to each child telephone number according to expenses information of telephone calls from the child telephone number to the master telephone number and from the master telephone number to the child telephone number, the call preferences comprising an incoming direction of the telephone calls from the child telephone number to the master telephone number, an outcoming direction of the telephone calls from the master telephone number to the child telephone number, and one or more alternative conversation channels between the master telephone number and the child telephone number, and
managing each telephone call received by the master telephone number from each child telephone number according to the corresponding call preference by displaying one or more switch commands on the telephone terminal in response to the received telephone call when the call preference is one or more of the alternative conversation channels, and closing the received telephone call and starting a conversation session between the master telephone number and the child telephone number via the corresponding alternative conversation channel in response to a selection of one of the switch commands.

13. A system for managing telephone calls, the system comprising:
a circuitry for setting at least part of one or more telephone numbers of one or more contacts of an owner of a telephone terminal as child telephone numbers of at least one master telephone number of the telephone terminal according to a correlation of the contacts to the owner based on user information thereof,
a circuitry for assigning at least one of a plurality of call preferences to each child telephone number according to expenses information of telephone calls from the child telephone number to the master telephone number and from the master telephone number to the child telephone number, the call preferences comprising an incoming direction of the telephone calls from the child telephone number to the master telephone number, an outcoming direction of the telephone calls from the master telephone number to the child telephone number, and one or more alternative conversation channels between the master telephone number and the child telephone number, and
a circuitry for managing each telephone call received by the master telephone number from each child telephone number according to the corresponding call preference by displaying one or more switch commands on the telephone terminal in response to the received telephone call when the call preference is one or more of the alternative conversation channels, and closing the received telephone call and starting a conversation session between the master telephone number and the child telephone number via the corresponding alternative conversation channel in response to a selection of one of the switch commands.

\* \* \* \* \*